Nov. 7, 1939. H. WESTBERG 2,179,108
NOZZLE FOR ARC-WELDING MACHINE
Filed June 12, 1937
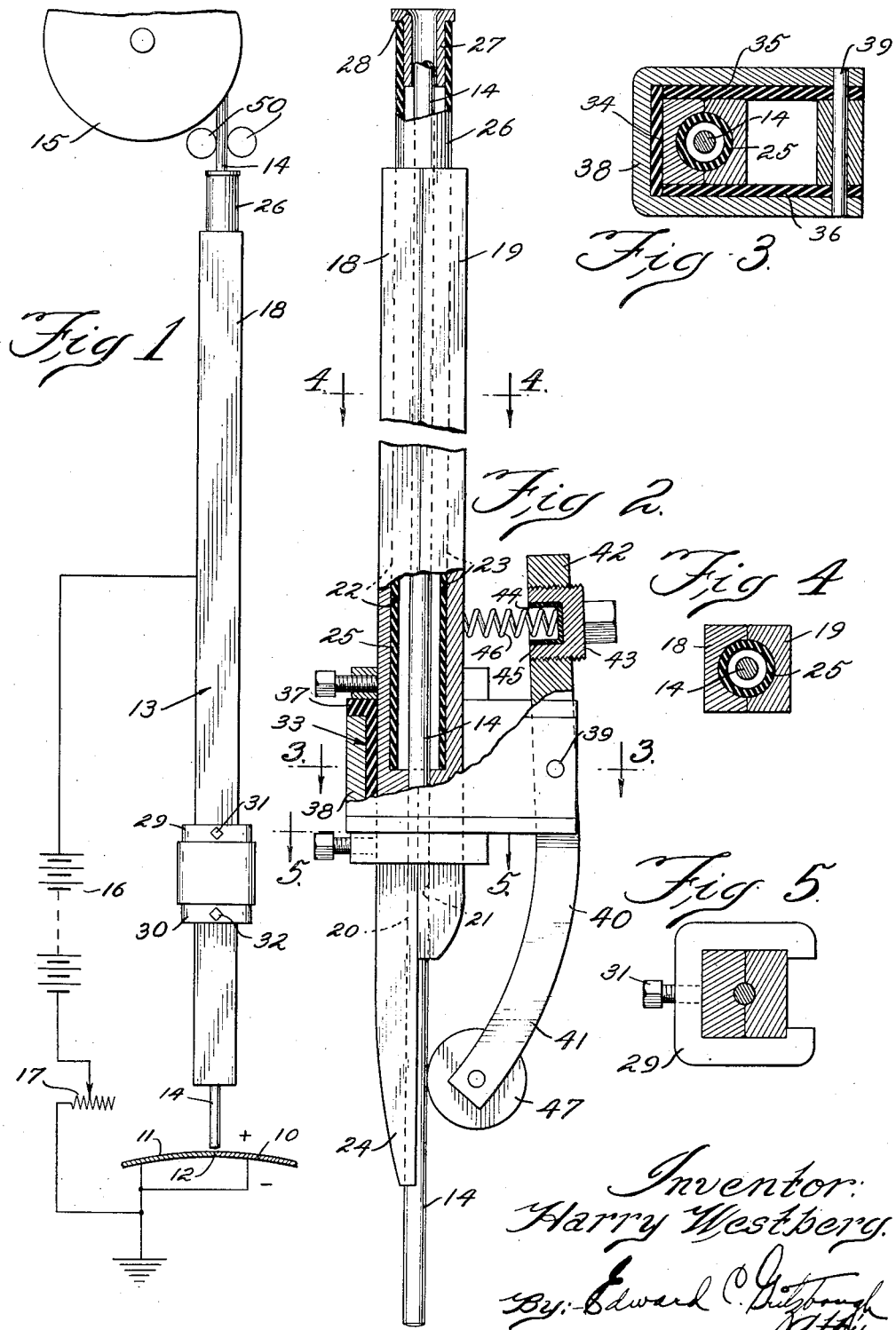

Patented Nov. 7, 1939

2,179,108

UNITED STATES PATENT OFFICE 2,179,108

NOZZLE FOR ARC-WELDING MACHINE

Harry Westberg, Chicago, Ill., assignor to Borg-Warner Corporation, Chicago, Ill., a corporation of Illinois Application June 12, 1937, Serial No. 147,929

3 Claims. (Cl. 219—8)

This invention relates to the art of electric welding and particularly to a nozzle to be used in an arc-welding machine.

Containers for fluids can frequently be made from two or more parts welded together to form a closed whole. An example of such a container is a metal barrel made by welding two tubs together. Since such containers must be fluid tight, it is necessary that the weld be continuous and preferably uniform to prevent the container from leaking at the joint.

It has been found expedient to weld containers, such as beer barrels, by means of an arc-welding machine in which the two halves of the barrel form a negative electrode, and a wire, fed from a reel, forms the positive electrode. Such machines can be equipped with an automatic means for maintaining a constant spacing between the barrel and wire for the proper maintenance of the arc, and with a rheostat for adjusting the intensity of the arc. The wire is connected to a source of electrical energy by passing it through a long, apertured copper bar, which serves in addition as a guide means for the wire.

Since the wire is fused in the arc and deposited on the joint, it moves continuously through the bar so that the melted part is continuously replaced by a fresh part. The diameter of the wire, however, is not always uniform and it frequently happens that an oversized portion must make its way through the apertured bar to the arc. I have found that when this occurs, the contact pressure between the wire and bar increases and is followed by a point or points at which pressure is decreased, and in extreme cases, by an actual separation between the bar and wire. This, in effect, strikes a secondary arc, or some other form of electrical discharge, such as a corona, which deprives the main arc of the necessary current for its maintenance and hence the latter momentarily fails. In the meantime, the joint has been automatically moved past the electrode, with the result that the portion of the joint then moved is not welded at all. Simultaneously, the automatic spacing device reduces the spacing between the electrodes as a result of the increased resistance therebetween occasioned by the failure of the arc, and upon reestablishment of the arc, the instant spacing is too small and the material consequently splatters, again forming an incomplete weld. These incomplete welds, of course, cause leaks in the container which must be repaired by hand at considerable expense.

It has been proposed to remedy this situation by decreasing the speed of the article so that the movement past the electrode will not be sufficient, during the failure of the arc, to cause a complete break in the weld. This, however, would increase the labor costs of the weld and hence is not a satisfactory solution.

The object of this invention is to provide an improved arc-welding apparatus which will form a uniform weld despite variations in the dimensions and condition of the material of the weld.

Another object of this invention is to provide a nozzle for an arc-welding machine which will form a satisfactory weld in a greatly reduced time.

These and other objects of this invention will become apparent from the following detailed description when taken together with the accompanying drawing which forms a part thereof and in which:

Fig. 1 is an elevation of a portion of the welding apparatus showing schematically the electrical connections to the electrodes.

Fig. 2 is a side elevation, partly in section, through the novel positive electrode and nozzle.

Fig. 3 is a section taken through a portion of the positive electrode and nozzle.

Fig. 4 is a section through another portion of the positive electrode and nozzle; and Fig. 5 is a section taken through the upper part of the positive electrode and nozzle.

The same reference characters are used to designate like parts throughout the several figures of the drawing.

In its preferred form, this invention comprises constructing the nozzle for the positive electrode in such a manner that electrical contact between the weld-forming wire electrode and the nozzle is precluded except through a very small portion of the nozzle, and insuring a firm contact between the wire electrode and nozzle near the tip of the nozzle. The contact pressure near the tip is made at least equal to, and preferably greater than the anticipated contact pressure between the wire electrode and nozzle at any other point along the nozzle. By this means a flow of current from the nozzle to the wire electrode sufficient to form the arc is insured at all times, and the formation of a current-draining secondary arc or a corona is prevented.

Referring now to the drawing for a detailed description of the invention, 10 and 11 are fragmentary sections of two metal sheets which are to be welded at their abutting ends 12. The sheets may be parts of any form of container, or of any sheet metal object whatsoever which are required to be welded with a fluid-tight joint. Spaced a short distance above abutting ends 12 is a nozzle which is designated generally by the reference character 13. A wire 14, which supplies the material for the weld, is passed through nozzle 13 and fed by rolls 50, or other means, from a supply spool or reel 15 located above nozzle 13. A source of electrical energy 16 is connected to nozzle 13 and metal sheets 10 and 11, and a rheostat 17 is used to control the amount of current passing through the circuit. Sheets 10 and 11 are preferably grounded so that the material is always at a safe working potential. The means for maintaining a predetermined spacing between wire 14 and the joint to be welded is not a part of this invention and hence is not shown on the drawing.

Nozzle 13 is comprised of two electro-conductive bars 18 and 19, the abutting surfaces of which are centrally grooved as at 20 and 21, respectively, to form a passageway for wire 14. Groove 20 of bar 18, and groove 21 of bar 19 are enlarged over the greater portion of the bars as shown at 22 and 23. In a typical case in which bar 18 was fifteen inches long, the enlarged portion extended to within three and one-half inches of the tip of the bar. Said bar 18 is made longer than bar 19 so that a portion 24 thereof extends beyond the end of bar 19. Wire 14 is therefore exposed for the length of extension 24.

Contact between wire 14 and grooves 22 and 23 of bars 18 and 19 respectively, is prevented by a cylindrical insulating lining 25 which may be made from fiber or from any of the well known and commercially available insulating materials. Lining 25 extends beyond the upper ends of bars 18 and 19 to eliminate the possibility of establishing electrical contact between wire 14 and the tops of the bars as the wire is fed therethrough. Extension 26 of lining 25 is provided with a flanged bushing 27 which is made of suitable wear-resistant material to protect the open end of lining 25. Inner edge 28 of insert bushing 27 is rounded off so that wire 14 will not be cut by, or be bound in, bushing 27.

Near the lower part of nozzle 13 is a pair of spaced clamps 29 and 30, each of which is supplied with a set screw 31 and 32 respectively. These clamps serve to hold bars 18 and 19 together and to locate a strap 33 on the bars.

Strap 33 may be made of one piece, or it may be comprised of a back member 34 and two side members 35 and 36 as shown in Fig. 3. It is preferably made from insulating material for reasons to be hereinafter given. The edges of members 34, 35 and 36 are turned up as at 37 (Fig. 2) to form a channel in which is located a metal strap 38. Thus metal strap 38 is completely insulated from bars 18 and 19. The ends of strap 38 are apertured to receive a pin 39. Between members 35 and 36 of the insulated strap, and pivoted on pin 39, is a lever 40, one end 41 of which is curved toward the bar and overhangs the exposed portion of wire 14. The opposite end 42 of lever 40 is apertured and tapped to receive a plug 43 which in turn has a cup-shaped aperture 44 facing bar 19. Aperture 44 in plug 43 has an insulated lining 45 which cooperates with a compression spring 46. Said spring 46 is compressed between bar 19 and lining 45 in plug 43. Thus end 42 of lever 40 is continually biased by spring 46 in a direction away from bar 19. By reason of pin 39, however, curved end 41 of lever 40 is correspondingly urged toward wire 14 to exert a constant pressure thereon. Friction between end 41 of lever 40 and wire 14 is lessened by the use of a roller 47 which is pivotally mounted in end 41 of lever 40 and rotates as wire 14 passes through the nozzle. The amount of pressure exerted by roller 47 upon wire 14 can be adjusted by means of the threaded plug 43 which, when turned in one direction, increases the initial compression on the spring and, when turned in the opposite direction, decreases such compression.

It is apparent now that because of insulating strap 33 and lining 45 no current can flow from bars 18 and 19 through spring 46, or strap 38, pin 39 and lever 40, to roller 47 and hence the roller has no significance from an electrical standpoint. Roller 47, therefore, serves merely to insure a predetermined pressure between wire 14 and extension 24 of bar 18 of the nozzle. It is also apparent that wire 14 cannot contact bars 18 and 19 except through grooves 20 and 21, both of which are relatively short. Since the pressure between wire 14 and extension 24 of bar 18 can be adjusted, it can be made at least equal to, and preferably greater than, any anticipated pressure which might arise between wire 14 and grooves 20 and 21 as a result of irregularities in the wire. For this reason, a constant current flows from bar 18 through extension 24 to wire 14 and hence the weld-forming arc is likewise constant.

The novel nozzle just described may be used in any arc-welding machine. Since the factors regulating the constancy of the arc are controlled, the speed of the welding operation may be increased by as much as 50% over the speed possible with the usual type of nozzle. The uniformity of the weld results in fewer rejects, particularly when the joint is exposed to fluids, and hence there is less waste in labor and materials.

It is understood that the nozzle may take other forms than the form shown, and that the means for exerting a constant pressure between the wire and nozzle may likewise be altered. The scope of the invention, therefore, is not to be limited to the foregoing description, but is to be determined by the appended claims.

I claim:

1. In a nozzle for an arc-welding machine adapted to direct a filler rod electrode of slightly irregular cross-section toward an arc, said nozzle comprising a bipartite apertured guide forming a discharge end portion through which said rod is adapted to be fed, one of said parts extending beyond the other part, a strap embracing said end portion, resilient means carried by said strap and arranged to engage said rod against said one part with a predetermined pressure, said guide-forming end portion being constituted of electrical conducting material and having a sufficient area of contact with said rod for conducting arc-forming current thereto, while at the same time, being of an area less than that which would result in said irregularities in said rod being fed producing a path of flow of such variable resistance as to cause undesirable fluctuation in the arc.

2. In a nozzle for an arc-welding machine adapted to direct a wire electrode of slightly irregular surface toward an arc, said nozzle comprising a bipartite apertured bar defining a feeding guide for said electrode, said guide defining portion being of electrically conductive material and having a predetermined limited area of contact with said rod, whereby the variable resistance of the path of flow from said guide-forming members through said rod by virtue of the contact of said irregular surface of said rod with said guide-forming means results in only a limited fluctuation in the arc, one of the parts of the bar extending beyond the end of the other part, resilient means carried by said bipartite bar and engaging said rod against said extended portion with a predetermined pressure whereby to further insure electrical conductivity between said bipartite apertured bar and said rod.

3. A nozzle for an arc welding machine adapted to direct a wire electrode toward an arc, said nozzle comprising a bipartite apertured bar, one of the parts of the bar extending beyond the end of the other part, a hollow insulator lining the greater portion of the aperture in said bar, a metallic flanged bushing at the end of the insulator, a channel in the extending portion of the first mentioned part of the bar, a U-shaped strap passing around the bar, means insulating the strap from the bar, an arm pivoted at the ends of the strap, a roller mounted at one end of the arm and adapted to contact the wire electrode, an insulated socket at the opposite end of the arm, a spring in said socket and bearing against the bar to urge the roller toward the wire, and means for predetermining the spring pressure to insure a greater pressure between the wire and the bar at the roller than at any other point of contact between the wire and bar.

HARRY WESTBERG.